US006592374B1

United States Patent
Kim

(12) United States Patent
(10) Patent No.: US 6,592,374 B1
(45) Date of Patent: Jul. 15, 2003

(54) MOTION SIMULATOR

(76) Inventor: Eui-sok Kim, 129-806, Hanbit Apartment, 99, Uh-eun-dong, Yoosung-gu, Daejeon-city (KR)

( * ) Notice: Subject to any disclaimer, the term of this patent is extended or adjusted under 35 U.S.C. 154(b) by 83 days.

(21) Appl. No.: 09/744,683

(22) PCT Filed: Jun. 9, 2000

(86) PCT No.: PCT/KR00/00600
§ 371 (c)(1),
(2), (4) Date: Jan. 29, 2001

(87) PCT Pub. No.: WO00/77762
PCT Pub. Date: Dec. 21, 2000

(30) Foreign Application Priority Data

Jun. 11, 1999 (KR) ........................... 1999-21812

(51) Int. Cl.[7] ............................. G09B 19/16; G09B 9/08
(52) U.S. Cl. ............................. 434/58; 434/29; 434/30; 434/62
(58) Field of Search ........................ 434/29, 30, 34–36, 434/38, 46, 55, 58, 62, 307 R, 308, 365; 472/60, 130

(56) References Cited

U.S. PATENT DOCUMENTS

| 1,393,456 | A | * | 10/1921 | Ruggles | ........................ 434/38 |
| 3,597,857 | A | * | 8/1971 | Akister et al. | ................. 434/58 |
| 3,890,722 | A | * | 6/1975 | Nunez | ........................ 434/55 |
| 4,753,596 | A | | 6/1988 | Hart et al. | |
| 4,976,438 | A | * | 12/1990 | Tashiro et al. | .......... 434/307 R |
| 5,433,608 | A | * | 7/1995 | Murray | ........................ 434/29 |
| 5,453,011 | A | * | 9/1995 | Feuer et al. | .................... 434/30 |
| 5,490,784 | A | | 2/1996 | Carmein | |
| 5,584,697 | A | * | 12/1996 | Trumbull | ..................... 434/29 |
| 5,622,503 | A | * | 4/1997 | Feng | .......................... 434/35 |
| 5,810,596 | A | * | 9/1998 | Van Lookeren Campagne | . 434/46 |

FOREIGN PATENT DOCUMENTS

| JP | 54-131432 | | 10/1979 |
| JP | 2-156978 | | 6/1990 |
| JP | 4-117690 | * | 10/1992 |

* cited by examiner

Primary Examiner—Joe H. Cheng
(74) Attorney, Agent, or Firm—Sughrue Mion, PLLC

(57) ABSTRACT

A motion simulator having a stationary frame and a movable frame below the stationary frame in the direction of gravity. A passenger car is attached to the bottom surface of the movable free. A driving device is located between the stationary frame and the movable frame and rotationally or linearly moves the movable frame.

2 Claims, 18 Drawing Sheets

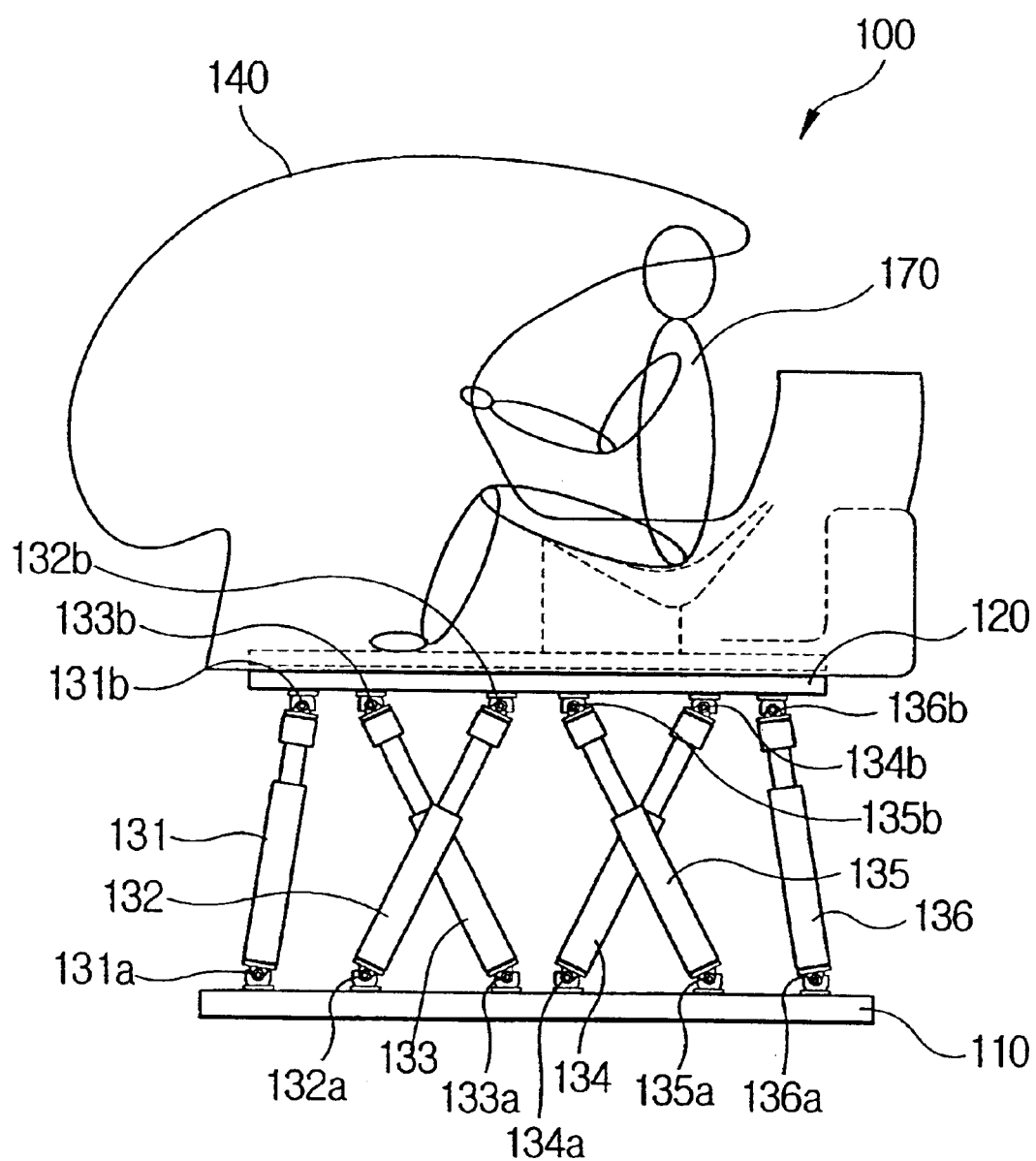

MOTION SIMULATOR

BACKGROUND OF THE INVENTION

This invention relates to a motion simulator, and particularly an improved motion simulator in which occurrence of undesired moving sensations are eliminated during the creation of moving sensations using gravity and thereby creation of a moving sensation which is more similar to the actual situation is possible.

Generally, a motion simulator refers to a device which simulates motions of objects such as an airplane or an automobile and allows people to feel moving sensations within a limited space.

As a general motion simulator such as the above, a 6 DOF (degree of freedom) motion simulator (100) in which a movable frame (120) is driven by six actuators (131, 132, 133, 134, 135, 136) is depicted in FIGS. 1 to 3b.

As depicted in FIG. 1, the conventional 6 DOF motion simulator(100) has a structure which includes a stationary frame (110), a movable frame (120), and a plurality of actuators (131, 132, 133, 134, 135, 136).

Said stationary frame (110) is installed fixedly against the ground (gravity field). Said movable frame (120) is disposed above the gravitational direction of the stationary frame (110). A passenger compartment (140) is disposed on the top surface of said movable frame (120).

Said plurality of actuators (131, 132, 133, 134, 135, 136) are disposed between the stationary frame (110) and the movable frame (120). Electric, hydraulic, or pneumatic actuators are generally used for each of said actuators.

Said each actuator (133, 132, 133, 134, 135, 136) is rotatably connected at both ends thereof by respective pairs of universal joints (131a and 131b, 132a and 132b, 133a and 133b, 134a and 134b, 135a and 135b, 136a and 136b).

The conventional 6 DOF motion simulator (100) configured as the above allows the passenger (170) in the passenger compartment (140) to feel moving sensations similar to those felt when actually riding an airplane or automobile by driving the plurality of actuators (131, 132, 133, 134, 135, 136) and thereby moving the movable frame (120).

For instance, for a racing car that has suddenly taken off and continues to accelerate, the passenger feels sensations of being pulled backward due to acceleration, and this sensation is continued while acceleration after start is being progressed.

To create such sensation, the motion simulator (100) drives the plurality of actuators (131, 132, 133, 134, 135, 136) and firstly accelerates the movable frame (120) forward, as depicted in FIG. 2a. In the above case, the passenger (170) within the passenger compartment (140) feels a pulling sensation from the rear to the force of inertia.

However, because the range of motion of the motion simulator (100) has a limit, the movable frame (120) which has been accelerated and moved forward shortly falls within this limit. At this time, as depicted in FIG. 2b, when the front of the movable frame (120) is lifted, the passenger (170) continues to feel said sensation due to gravity.

On the other hand, as another example, for an automobile turning along a large curve, the passenger feels a pushing sensation to the outer direction of the curve due to centrifugal force, and continues to feel this sensation while the turning is being progressed.

To create such sensation, the motion simulator (100) actuates the plurality of actuators (131, 132, 133, 134, 135, 136) and firstly accelerates the movable frame (120) to the side director, as depicted in FIG. 3a. In the above case, the passenger (170) within the passenger compartment (140) feels a sensation of being pushed in the opposite direction of said movement due to the force of inertia.

However, also for this case, because the range of motion of the motion simulator (100) has a limit, the movable frame (120) which has been accelerated and moved to the side direction shortly falls within this limit. At this time, as depicted in FIG. 3b, when the side of the movement direction of the movable frame (120) is lifted, the passenger (170) continues to feed said sensation.

On the other hand, in FIGS. 4 to 6, as another example of the conventional motion simulator, a 3 DOF motion simulator (101) of which the movable frame (120) is driven by three actuators (131', 132', 133') is depicted.

According to FIGS. 4 to 6, the configuration of the conventional 3 DOF motion simulator (101) is identical to that of the 6 DOF motion simulator except that the former has three actuators (131', 132', 133' and that it is provided with a separate support member (150) to limit the occurrence of unintended forward/backward linear motion, left/right linear motion, and rotating motion centered on the top, bottom axes perpendicular to the surface of the movable frame (120).

Therefore, in describing the configuration of the 3 DOF motion simulator (101), same reference numbers are designated for parts identical to those of the 6 DOF motion simulator, and the descriptions thereof are omitted.

Meanwhile, as mentioned above, because all motions of the movable frame (120) can not be restrained with only the actuators (131', 132', 133'), in the depicted conventional 3 DOF motion simulator (101), there is provided a separate support member (150) for limiting the occurrence of unintended motion to the movable frame (120).

Said support member (150) is composed of a cylinder (151) which is fixed on the stationary frame (110), a piston (152) which moves up and down along said cylinder, and a universal joint (153) which connects said piston and the movable frame (120)

In the case of the conventional 3 DOF motion simulator (101) configured as the above, because there is no DOF to the horizontal direction, that is, the direction perpendicular to gravity, when creating continuous accelerating motion or rotating motion as mentioned above, only the force of gravity is used.

Namely, to create a linear accelerating sensation, the motion simulator (101) drives the plurality of actuators (131', 132', 133') and lifts the front of the movable frame (120) and thereby allows the passenger (170) to feel a rearward pulling sensation, as depicted in FIG. 5.

In addition, to create rotating movement, the motion simulator (101) drives the plurality of actuators (131', 132', 133') and lifts one side of the movable frame (120) and thereby allows the passenger (170) to feel a pushing sensation to the other side, as depicted in FIG. 5.

However, according to the conventional motion simulator (100, 101) configured as the above, both simulators have a structure in which the center of gravity of the passenger (170) is above the center of rotation of the movable frame (120).

Due to the above, when representing acceleration from continuous linear acceleration or from centrifugal motion to the side direction, that is, when the movable frame (120) is tilted to utilize gravity, there is the problem of occurrence of undesired acceleration.

This awkward sensation (that is, force) may be expressed with the following equation $$A_p = A_v + A \times R_{pv} + \omega \times \omega \times R_{pv}$$

Wherein, $A_p$ is the acceleration vector felt by the passenger of the motion simulator, $A_v$ is the acceleration vector of the moving movable frame of the motion simulator, A is rotational acceleration vector of the movable frame, $R_{pv}$ is the relative position vector of the passenger on top of the motion plate, and ω is the rotational velocity vector.

The awkward sensation is sum of the calculation value of the cross product of A and $R_{pv}$ vectors, which as $A \times R_{pv}$, and the calculation value of the cross product of ω, ω, $R_{pv}$ vectors, which is $\omega \times \omega \times R_{pv}$.

Namely, n the structure of conventional motion simulators (100, 101), because the center of gravity of the passenger (170) exists vertically above the center of rotation of the movable frame (120), when starting to rotate the movable frame to apply an accelerating sensation to the passenger, the value of the $A \times R_{pv}$ vector becomes the opposite direction of the acceleration intended to be created.

A graph displaying the above is shown in FIG. 7. The dotted line in FIG. 7 represents the control reference signals which repeats acceleration and deceleration of 3 m/s², and the solid line represents the ac/deceleration sensed by the passenger riding on the motion simulator driven by inputting the above signals.

In FIG. 7, as shown by the pointed portions bulging out in the opposite direction of the changes in the reference signals, in contrary to the intended pushing to one side sensation, a sudden attraction to the opposite side is experienced.

As a result of such problems, as shown by the solid line of FIG. 7, a moving sensation in the opposite direction of the moving sensation intended to be created (dotted line of FIG. 7) is applied, and furthermore, the time taken to track the intended moving sensation is delayed. This means a decline in actuality experienced by the passenger.

In the case of the 6 DOF motion simulator taken for instance previously, because of the limited range of linear motion, if the movable frame is rotated, a moving sensation opposing the intended moving sensation occurs as soon as the rotation is initiated.

In the foregoing, the problems of the conventional motion simulator has been described taking the 6 DOF and the 3 DOF motion simulators as two types of examples. However, although the extent may vary, the above mentioned problems of conventional motion simulators occur in all motion simulators having different degrees of freedom that possess functions which apply linear accelerating sensations to passengers using rotation and gravitational acceleration, and whose centers of rotation are located beneath the passenger.

SUMMARY OF THE INVENTION

Therefore, the technical task that the present invention seeks to achieve, that is, the object of the present invention is to resolve he above mentioned problems of the conventional motion simulator by providing a motion simulator that allows moving sensations similar to she intended sensations and which reduces tracking time, through the elimination of undesired moving sensations when creating moving sensations using gravity.

The above object of this invention is achieved by providing a motion simulator according to his invention characterized in that it comprises a stationary frame; a movable frame which is disposed beneath said stationary frame in the direction of gravity, and which has the passenger compartment attached on the bottom surface thereof; and a driving device disposed between said stationary frame and said movable frame, which rotationally or linearly moves the movable frame.

According to the motion simulator of this invention, because the movable frame is disposed underneath the stationary frame, the center of gravity of the passenger is lower than the center of rotation of the movable frame.

Namely, because the value of the $A \times R_{pv}$ vector is in the same direction as the acceleration intended to be created even at he point of rotation commencement, there are advantages in which undesired accelerating sensations are not occurred even during acceleration representation using gravity, and the tracking time of the intended moving sensation is reduced.

BRIEF DESCRIPTION OF THE DRAWINGS

FIG. 1 is a schematic drawing of the structure of one example of a conventional 6 DOF motion simulator;

DETAILED DESCRIPTION OF THE PREFERRED EMBODIMENTS

The preferred embodiments of the present invention are described in detail with reference to the annexed drawings.

In FIGS. 8 to 10b the motion simulator according to one embodiment of this invention is depicted. The depicted motion simulator (200) is a 6 DOF motion simulator in which the movable frame (220) is driven by six actuators (231, 232, 233, 234, 235, 236).

Figure 2A:
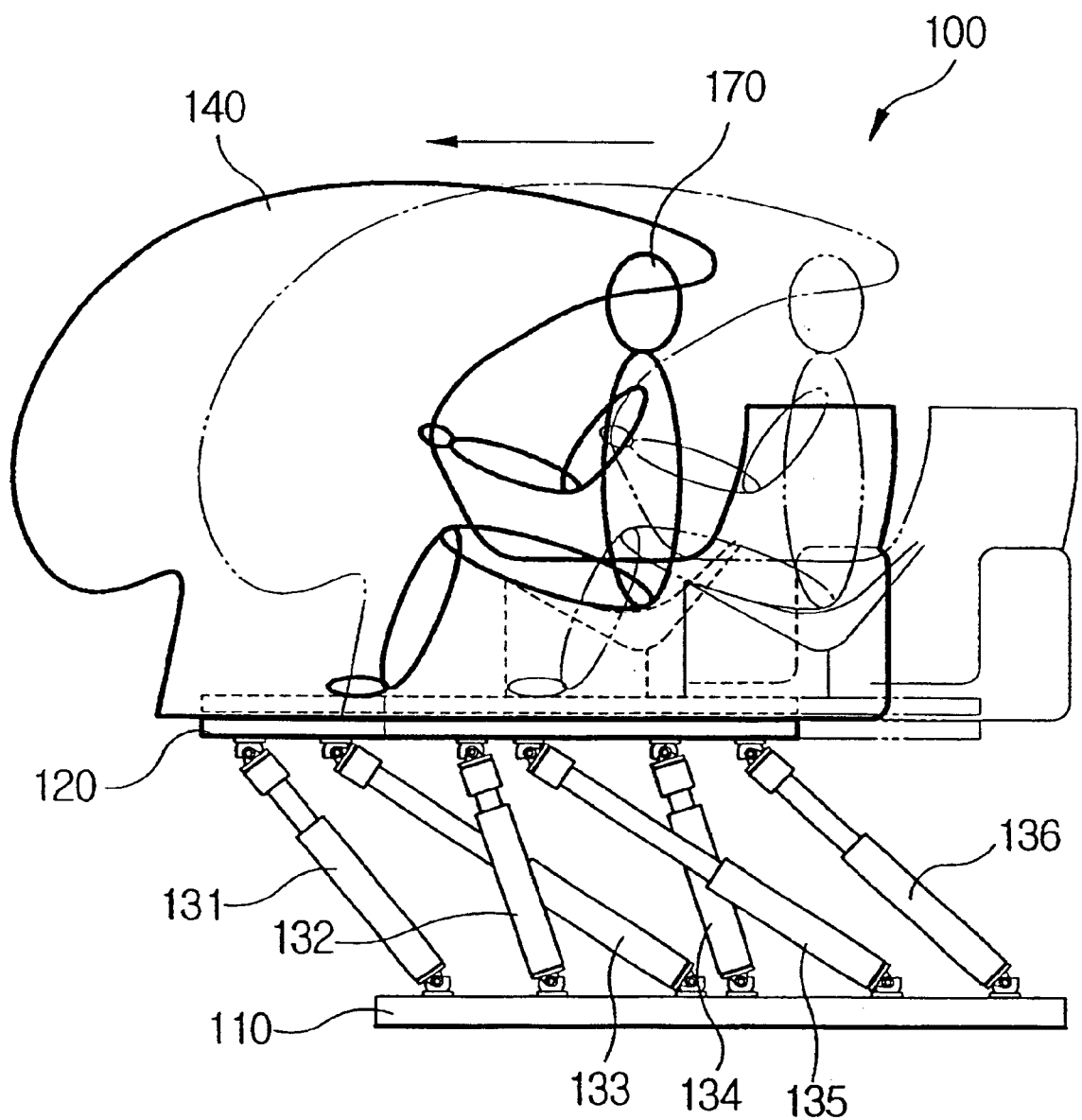
FIGS. 2a and 2b are drawings showing the accelerating sensation creation procedure of the motion simulator of FIG. 1.
Figure 2B:
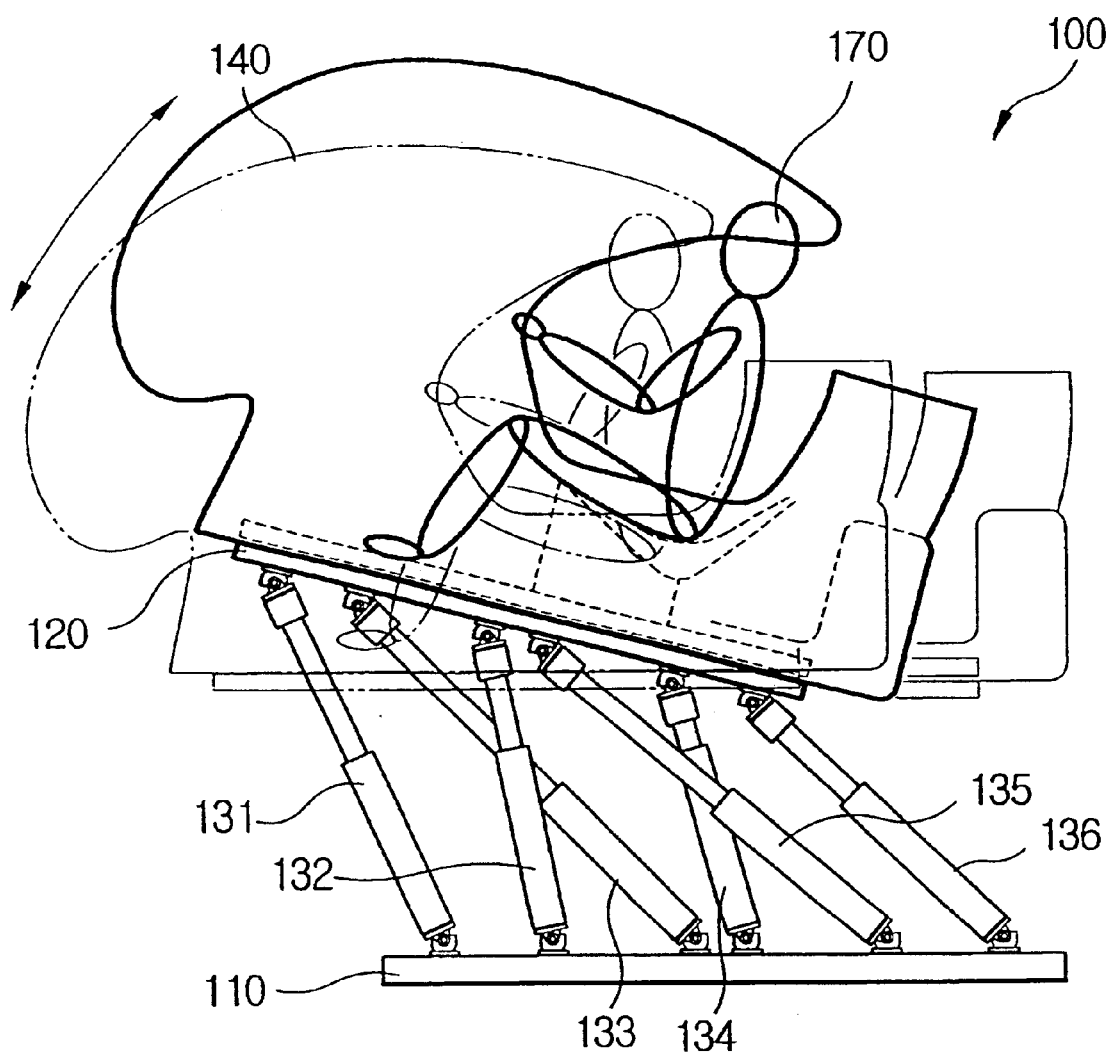
Figure 3A:
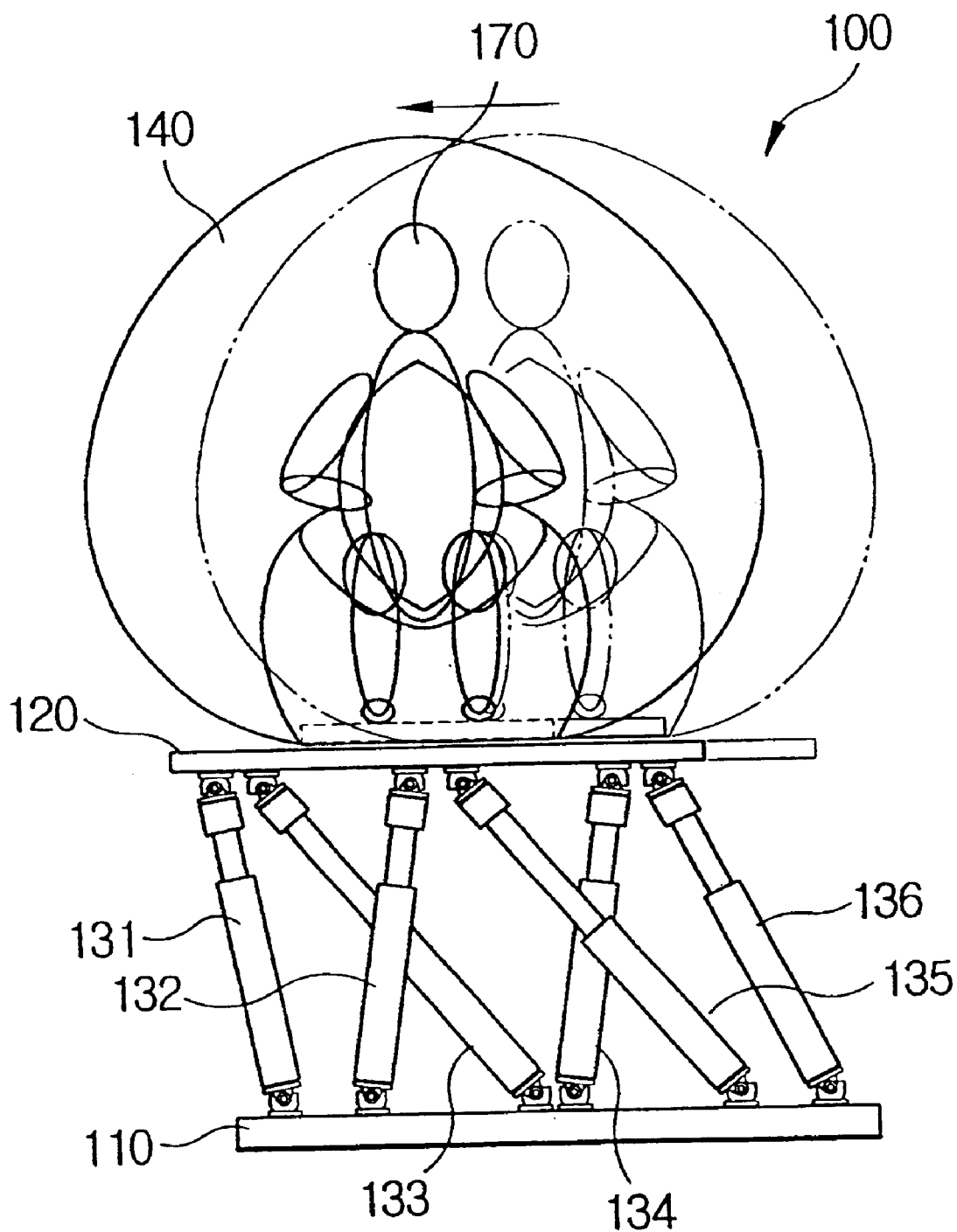
FIGS. 3a and 3b are drawings showing the rotating sensation creation procedure of the motion simulator of FIG. 1.
Figure 3B:
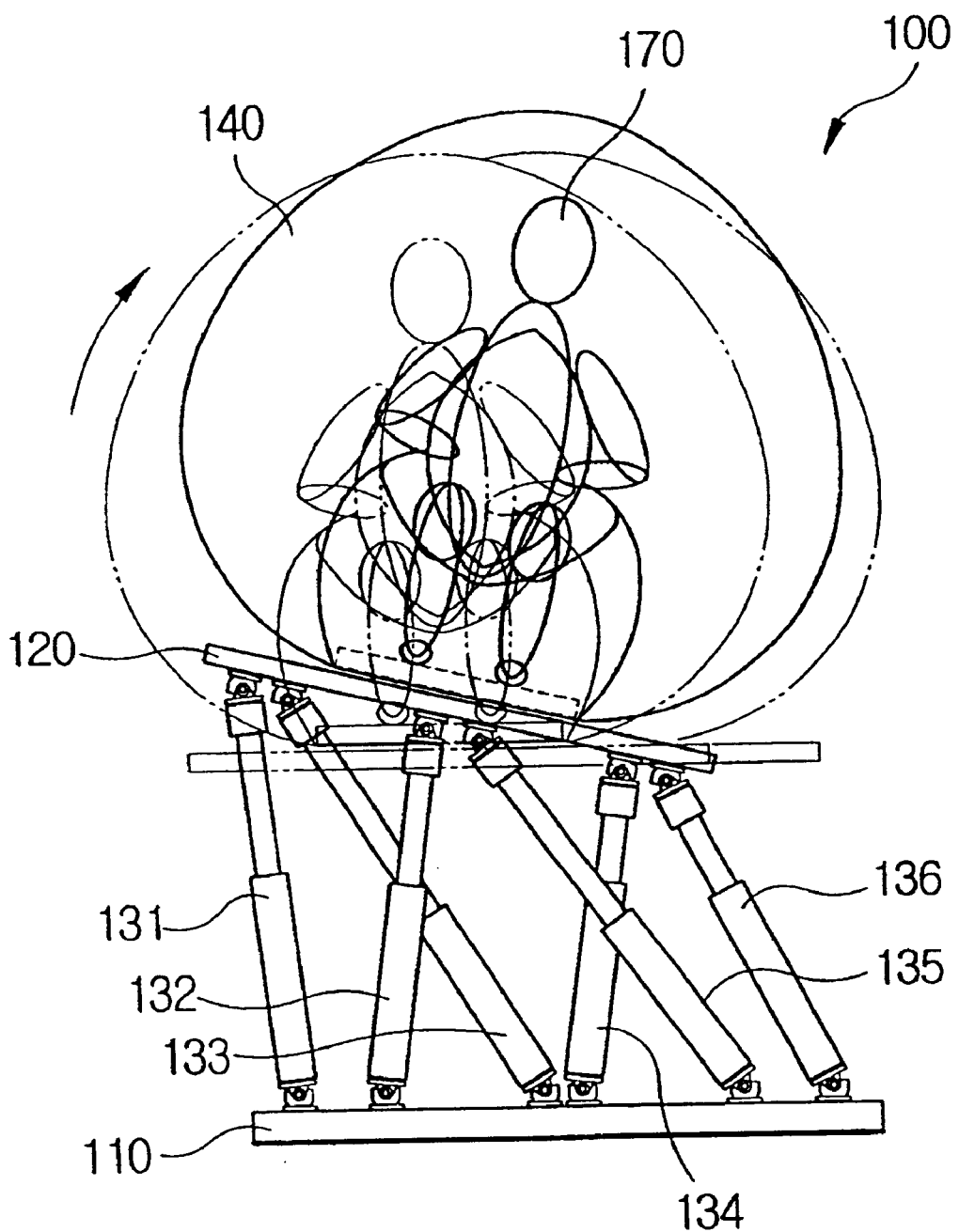
Figure 4:
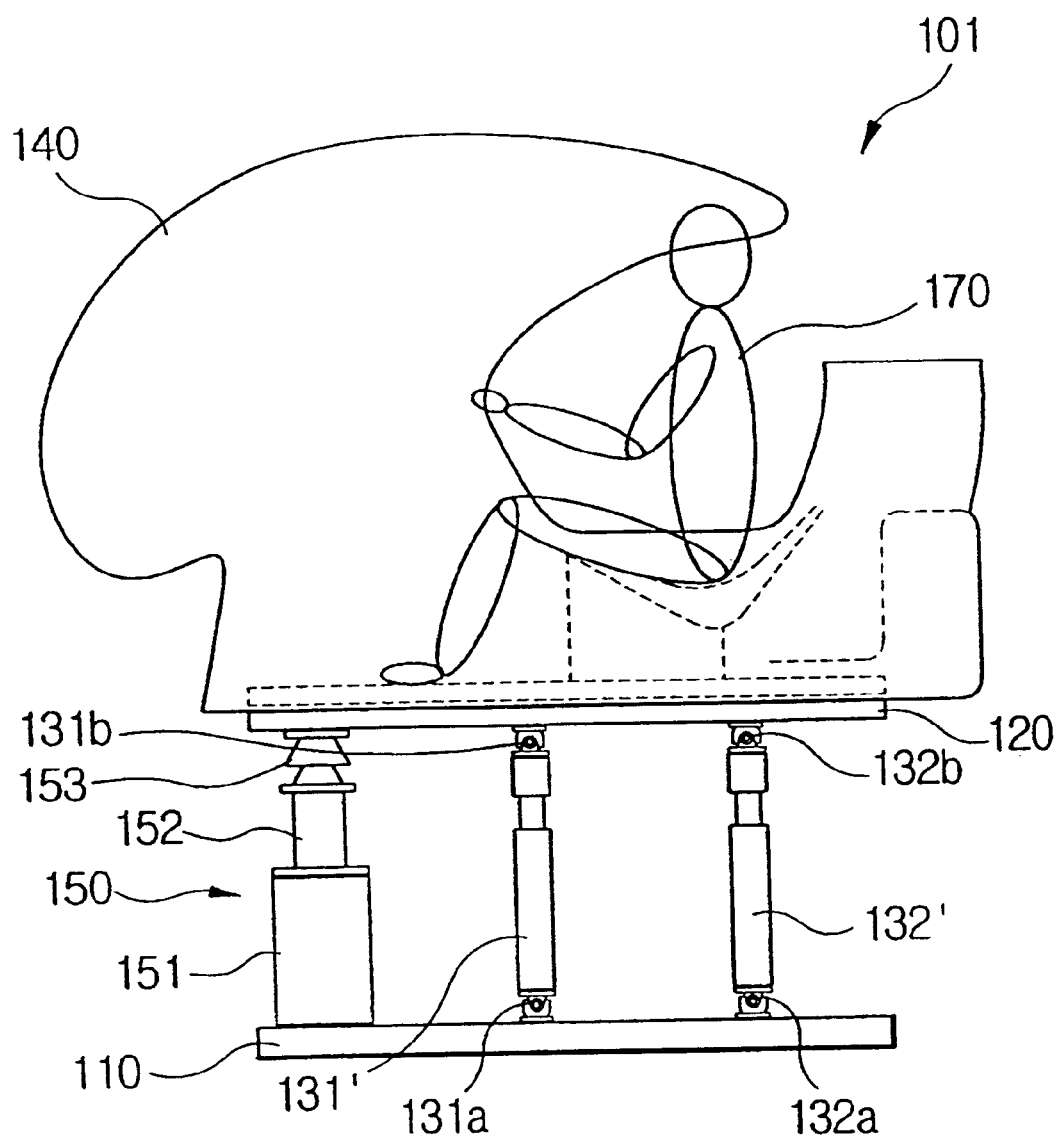
FIG. 4 is a schematic drawing of the structure of one example of a conventional 3 DOF motion simulator.
Figure 5:
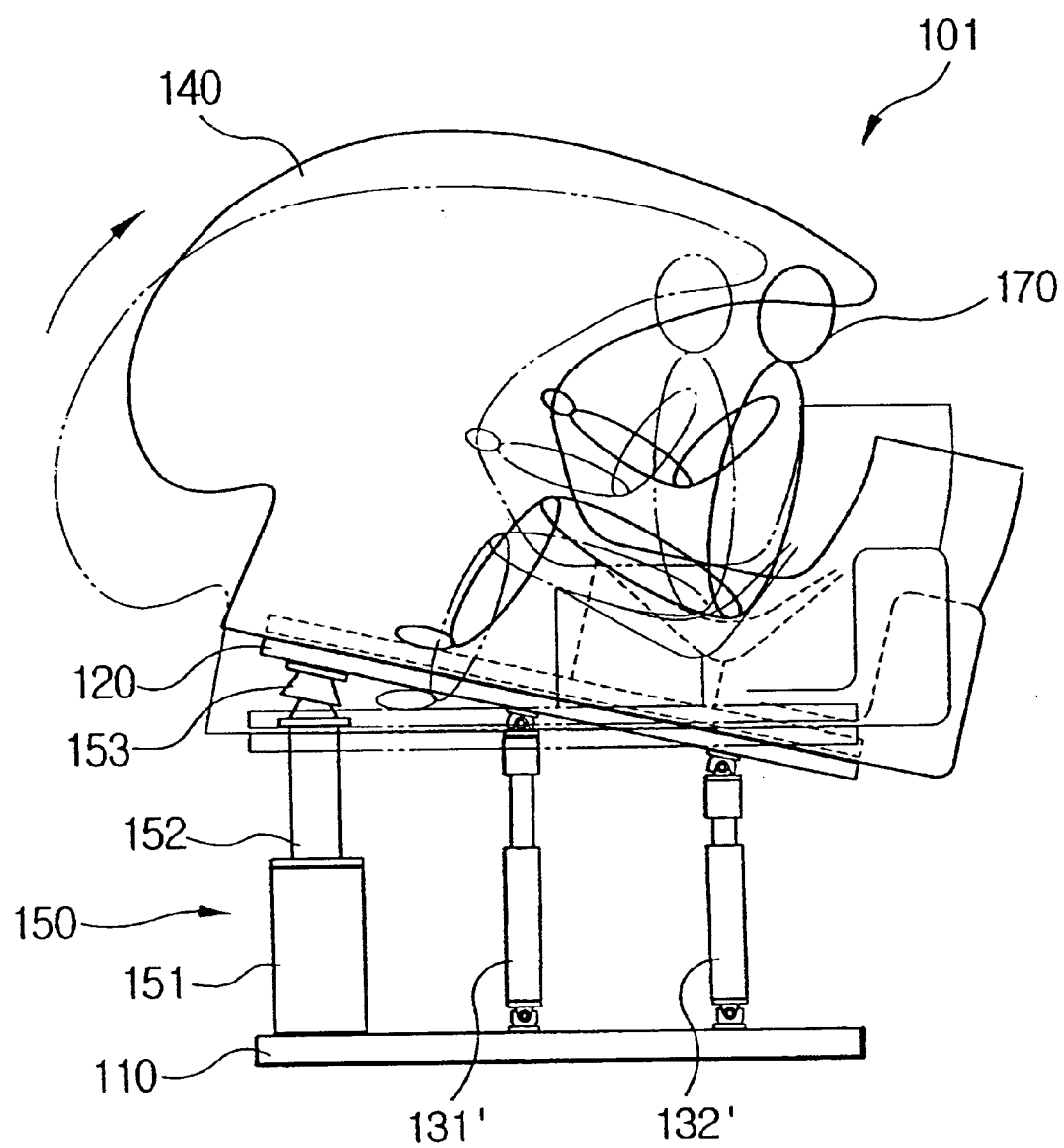
FIG. 5 is a drawing showing the accelerating sensation creation procedure of said 3 DOF motion simulator.
Figure 6:
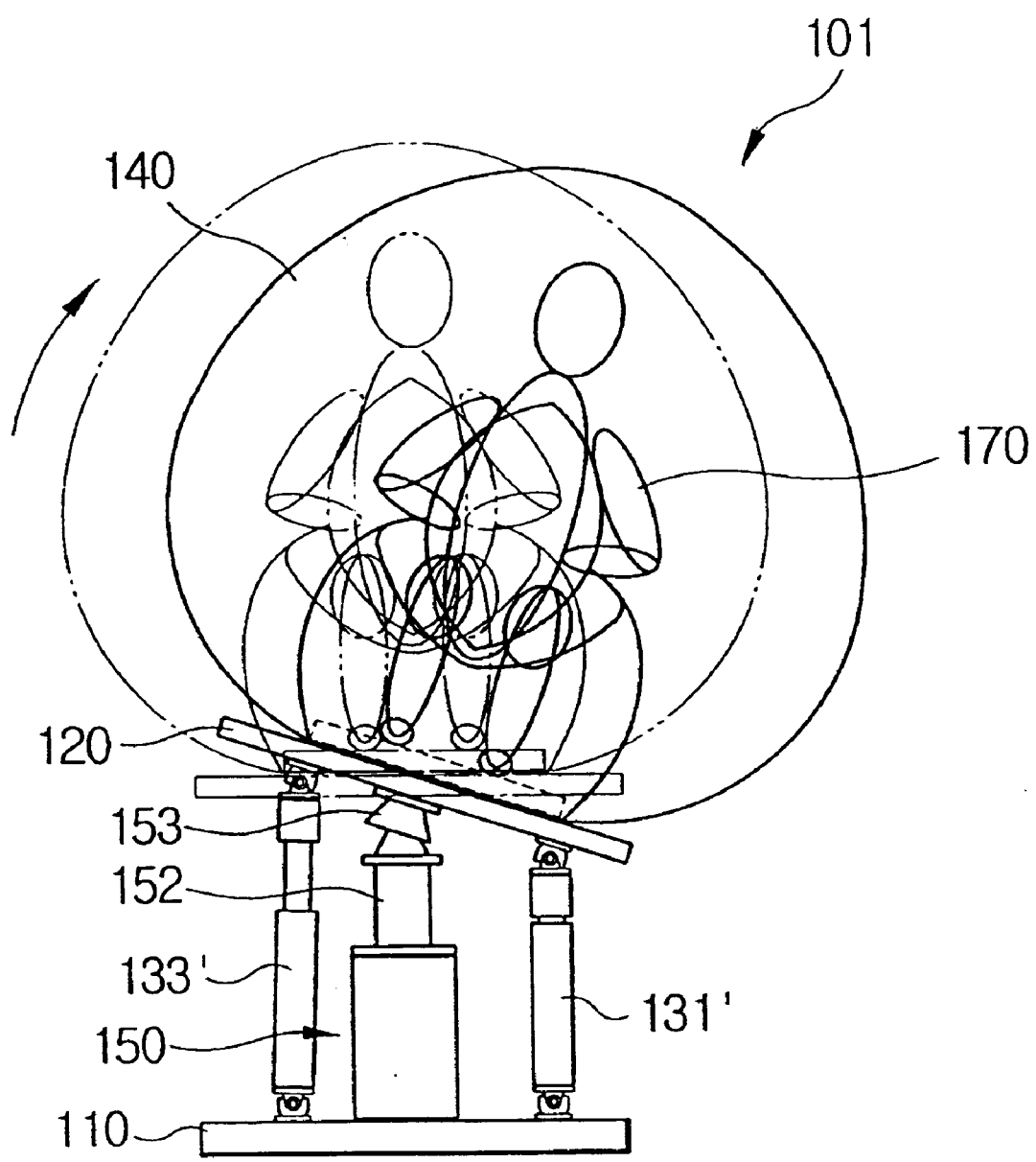
FIG. 6 is a drawing showing the rotating sensation creation procedure of said 3 DOF motion simulator.
Figure 7:
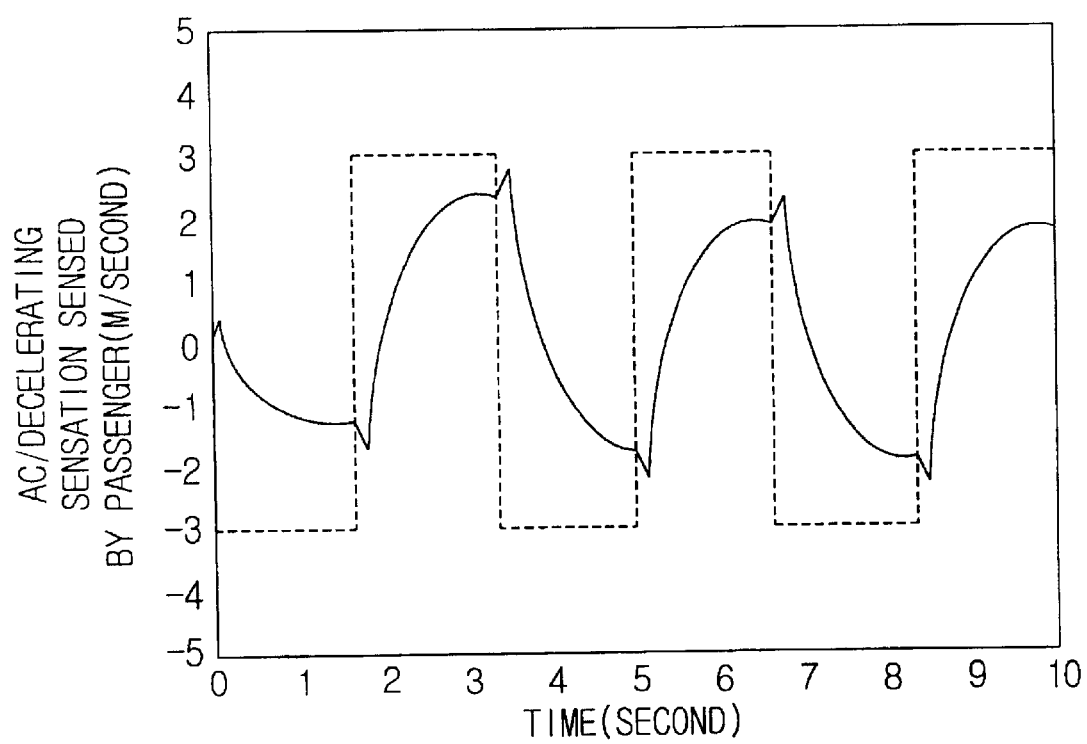
FIG. 7 is a graph showing a conventional motion simulator being driven by inputting control reference signals that repeat 3 m/s ac/deceleration, and the ac/decelerating sensation sensed by a passenger riding the simulator.
Figure 8:
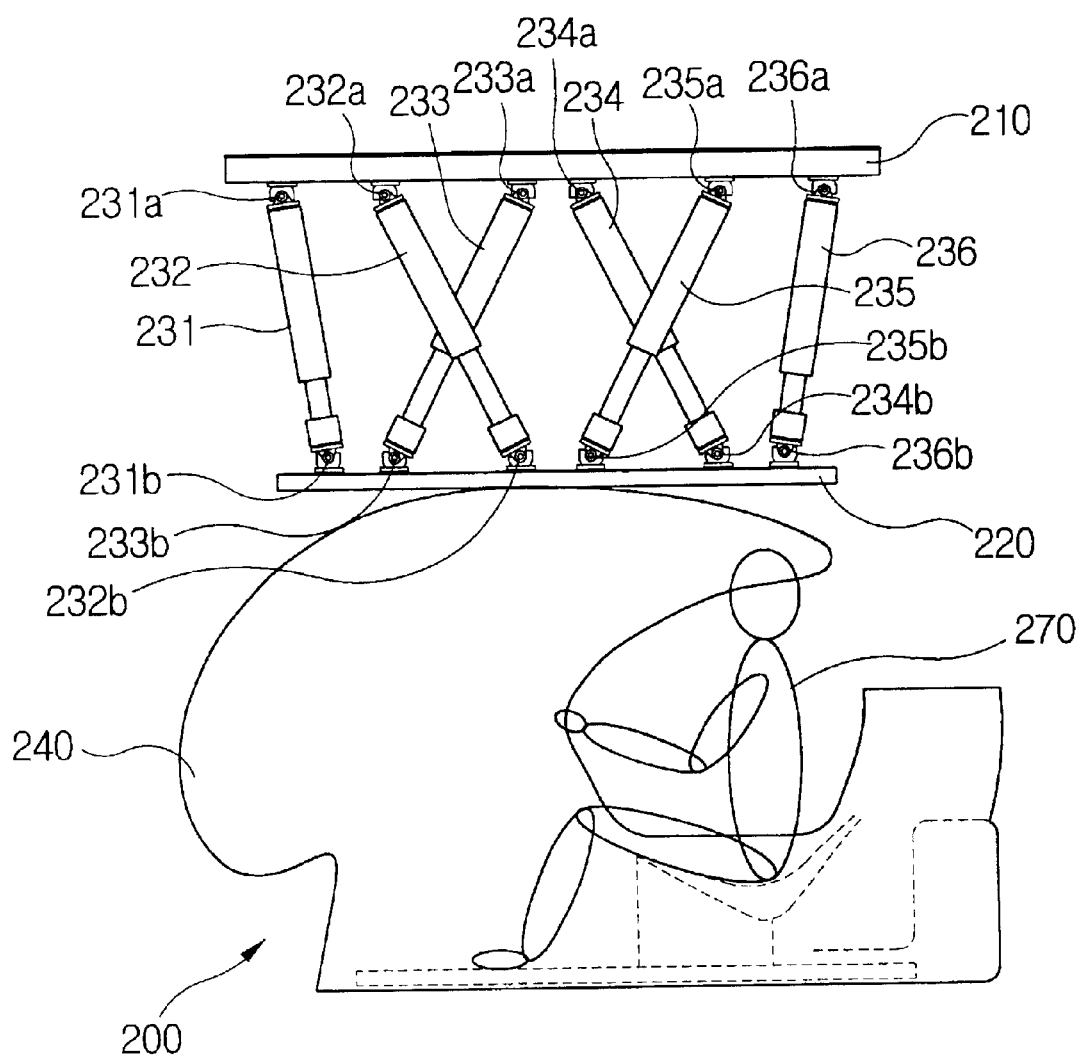
FIG. 8 is a schematic drawing of the structure of the 6 DOF motion simulator according to one embodiment of this invention.

According to FIG. 8, the 6 DOF motion simulator (200) as according to one embodiment of this invention includes a stationary frame (210), a movable frame (220), and a plurality of actuators (231, 232, 233, 234, 235, 236).

Said stationary frame (210) is installed such that it is fixed relative to the around (gravity field). Said movable frame (220) is disposed vertically below the stationary frame (210. Underneath said movable frame (220), a passenger compartment (240) is disposed.

Said plurally of actuators (231, 232, 233, 234, 235, 236) are disposed between the stationary frame (210) and the movable frame (220) Said each actuator (231, 232, 233, 234, 235, 236) may be electric, hydraulic, or pneumatic actuators.

Said each actuator (231, 232, 233, 234, 235, 236) is rotatably connected at both ends thereof by respective pairs of universal joints (231a and 231b, 232a and 232b, 233a and 233b, 234a and 234b, 235a and 235b, 236a and 236b).

The 6 DOF motion simulator (200) according to one embodiment of this invention configured as the above allows the passenger (270) in the passenger compartment (240) to feel moving sensations similar to those felt when actually riding an airplane or automobile by driving the plurality of actuators (231, 232, 233, 234, 235, 236) and thereby moving the movable frame (220).

Figure 9A:
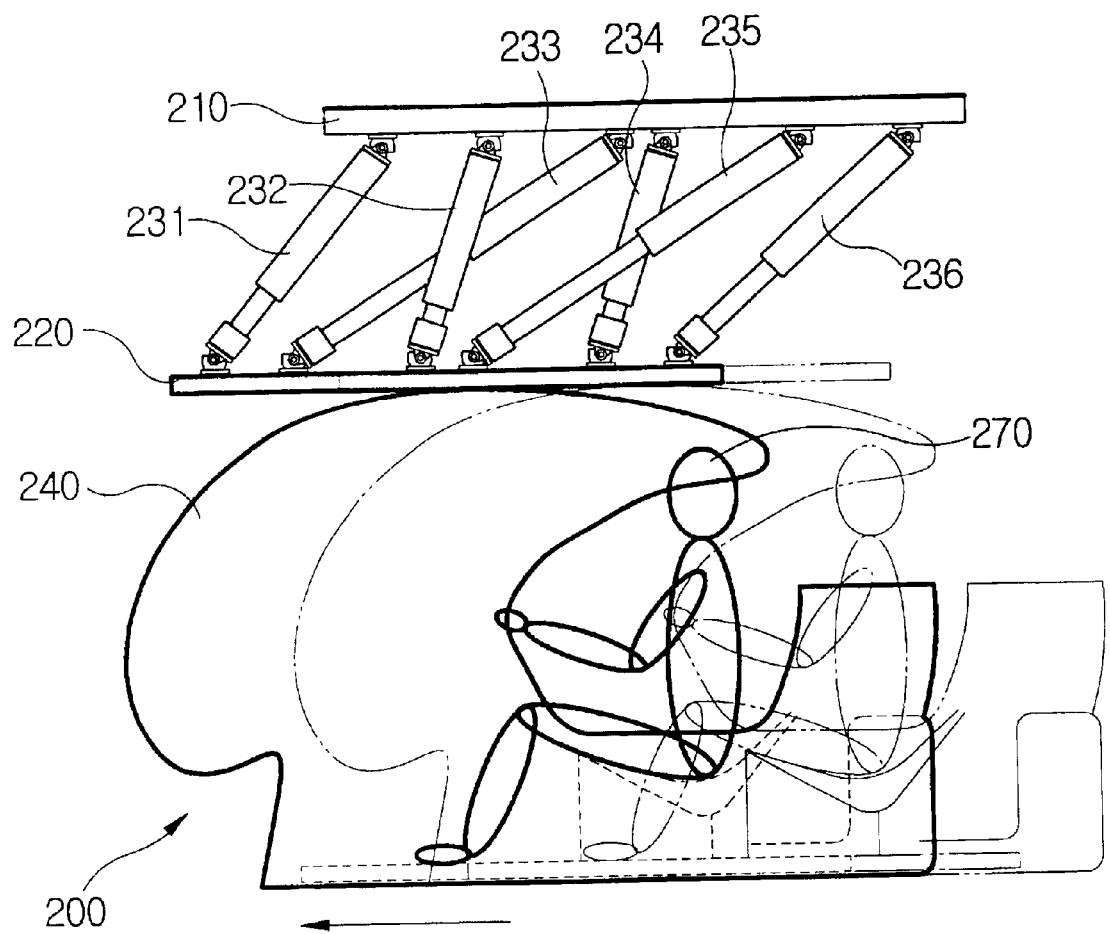
FIGS. 9a and 9b are drawings showing the accelerating sensation creation procedure of the motion simulator according to one embodiment of this invention.
Figure 9B:
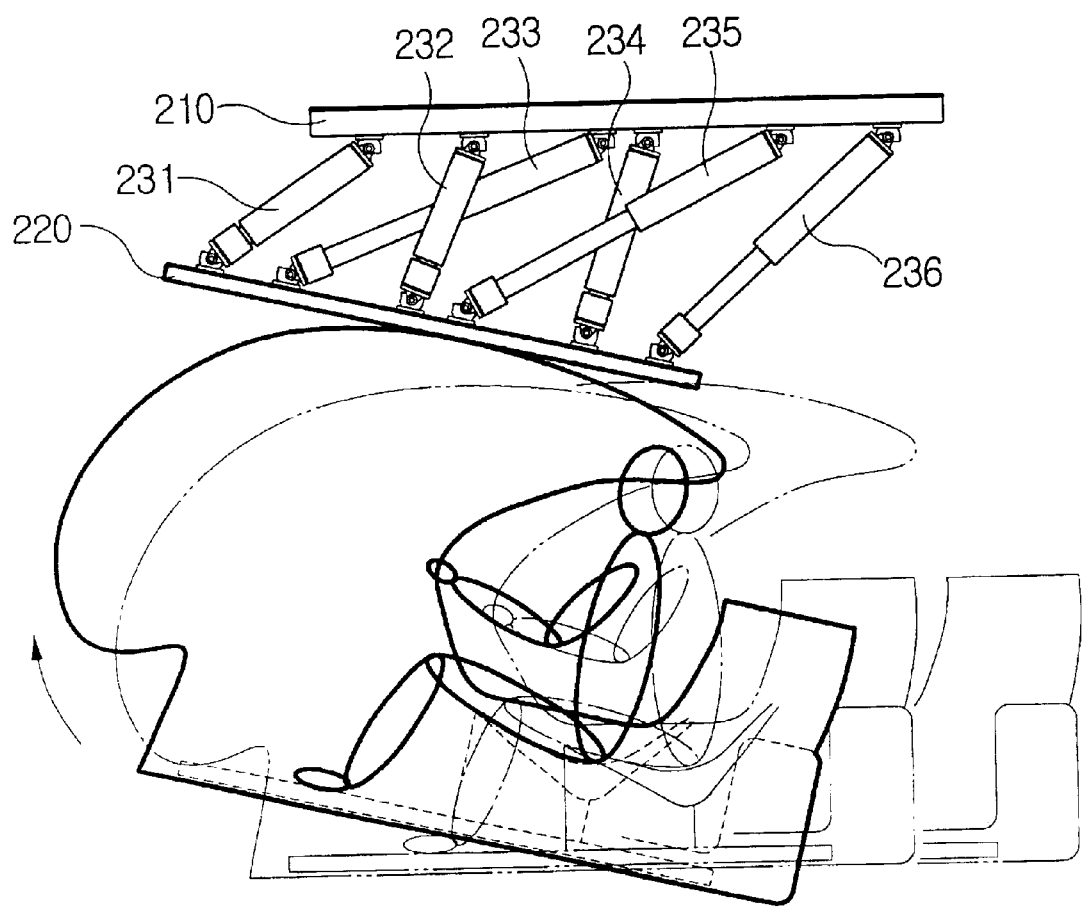

For instance, to create a continuous accelerating sensation the motion simulator (200) drives the plurality of actuators (231, 232, 233, 234, 235, 236), as depicted in FIG. 9a, and firstly accelerates the movable frame (220) forward. In the above case, the passenger (270) within the passenger compartment (240) feels a pulling sensation from the rear due to the force of inertia, and then when the front of the movable frame (220) is lifted, as depicted in FIG. 9b, the passenger (270) continues to feel said sensation due to gravity. The rotational movement is started while lifting the front of the movable frame (220), however, at this point the force of inertia a produced from radial acceleration is in the same direction as the force of inertia causing said sensation. Therefore, distinctive from the conventional motion simulator, there is no undesired moving sensation to the opposite direction, and also, in the present invention, with appropriate adjustment of rotational radial velocity, the force of inertia may be controlled to the desired amount.

Figure 10A:
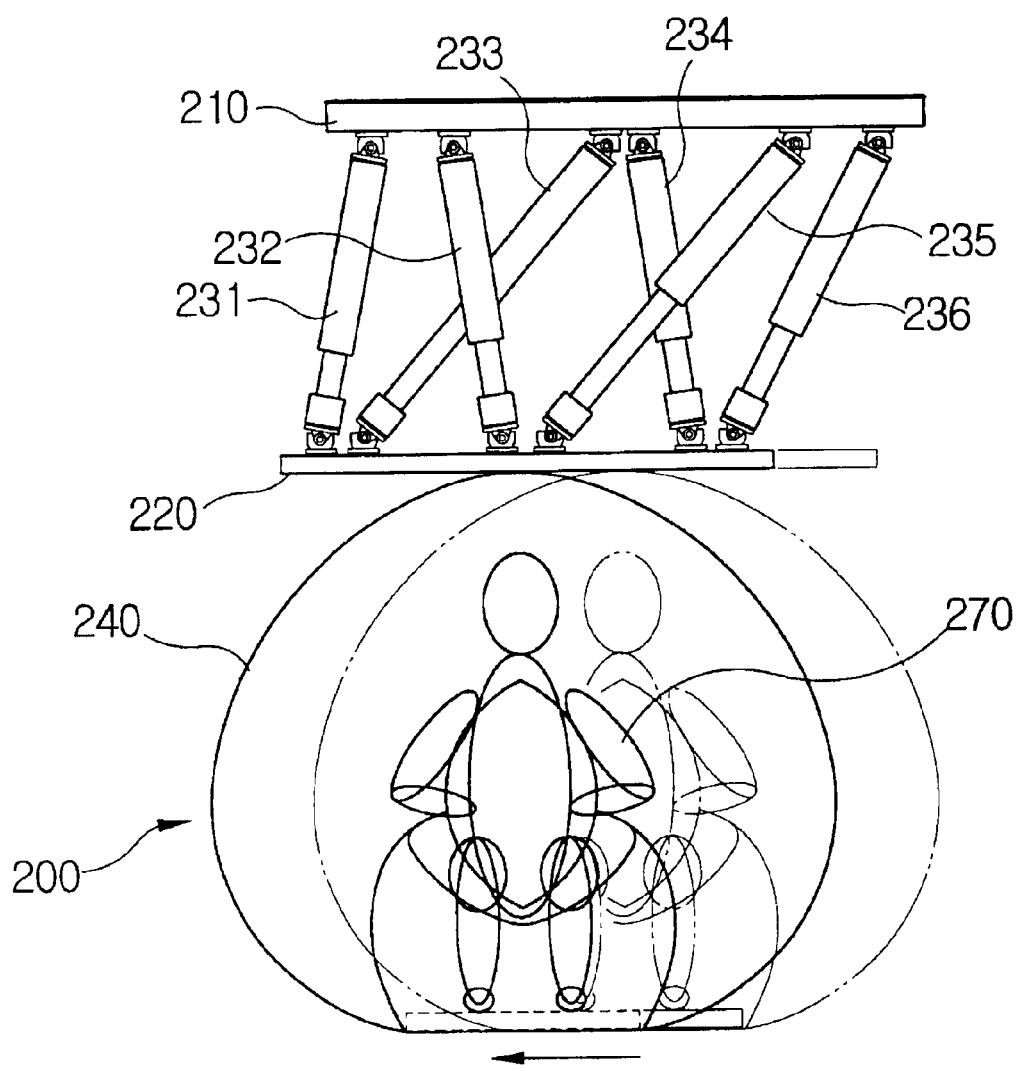
FIGS. 10a and 10b are drawings showing the rotating sensation creation procedure of the motion simulator according to one embodiment of this invention.

In addition, as another example, to create a rotating sensation from centrifugal force, the motion simulator (200) actuates the plurality of actuators (231, 232, 233, 234, 235, 236), as depicted in FIG. 10a, and firstly accelerates the movable frame (220) to the side direction.

Figure 10B:
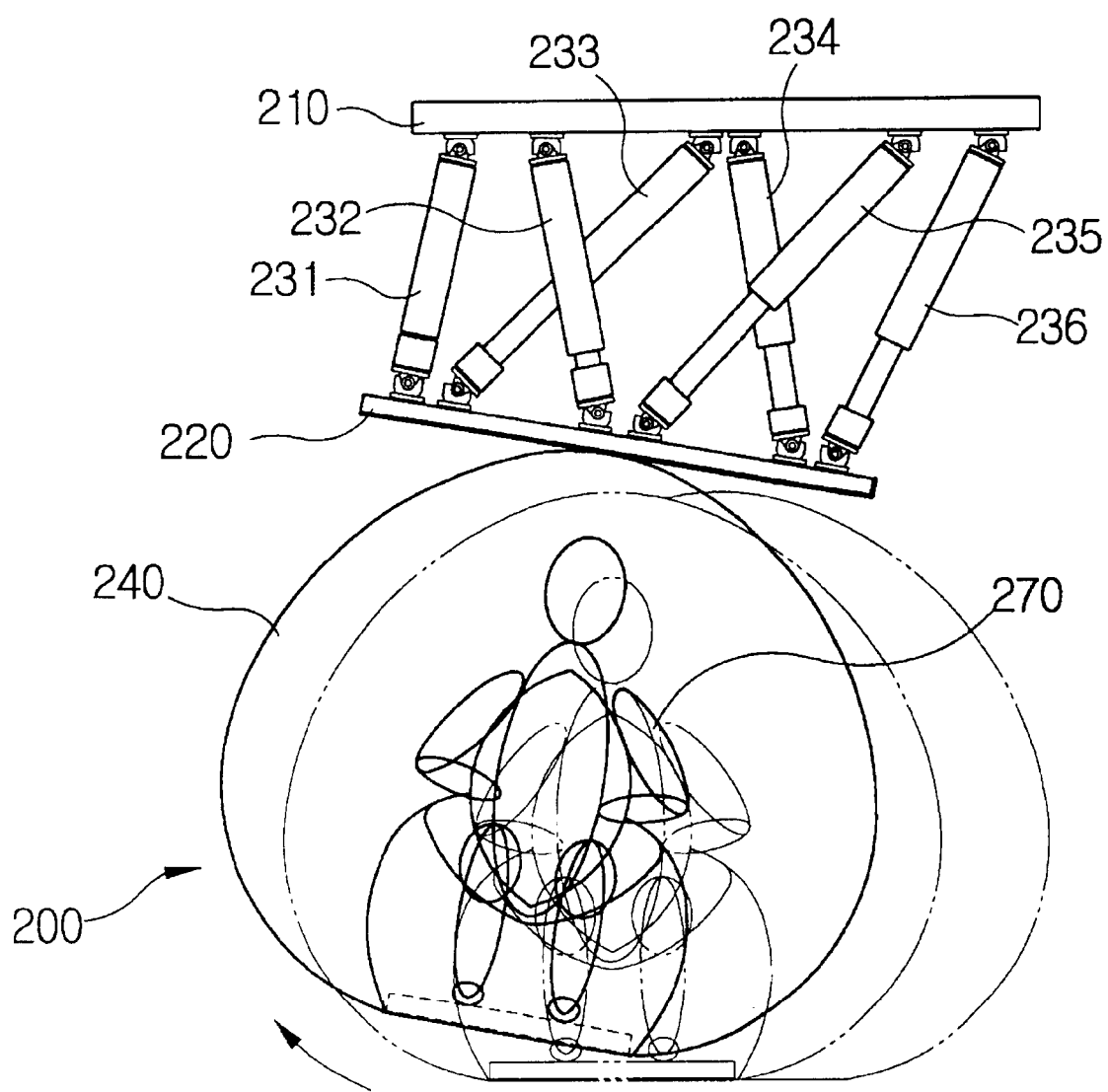

In the above case, the passenger (270) within the passenger compartment (240) feels a sensation of being pushed in the opposite direction of said movement due to the force of inertia, and then, when he side of the movement direction of the movable frame (220) is lifted, as depicted in FIG. 10b, the passenger compartment (240) continues to feel said sensation. Also at this point, the rotational movement is started while the movement direction side of the movable frame (220) is being lifted, but the force of inertia produced from radial acceleration is in the same direction as the force of inertia causing said sensation. Therefore, distinctive from the conventional motion simulator, there is no undesired moving sensation to the opposite direction, and also, in the present invention, with appropriate adjustment of rotational radial velocity, the force of inertia may be controlled to the desired amount.

Figure 11:
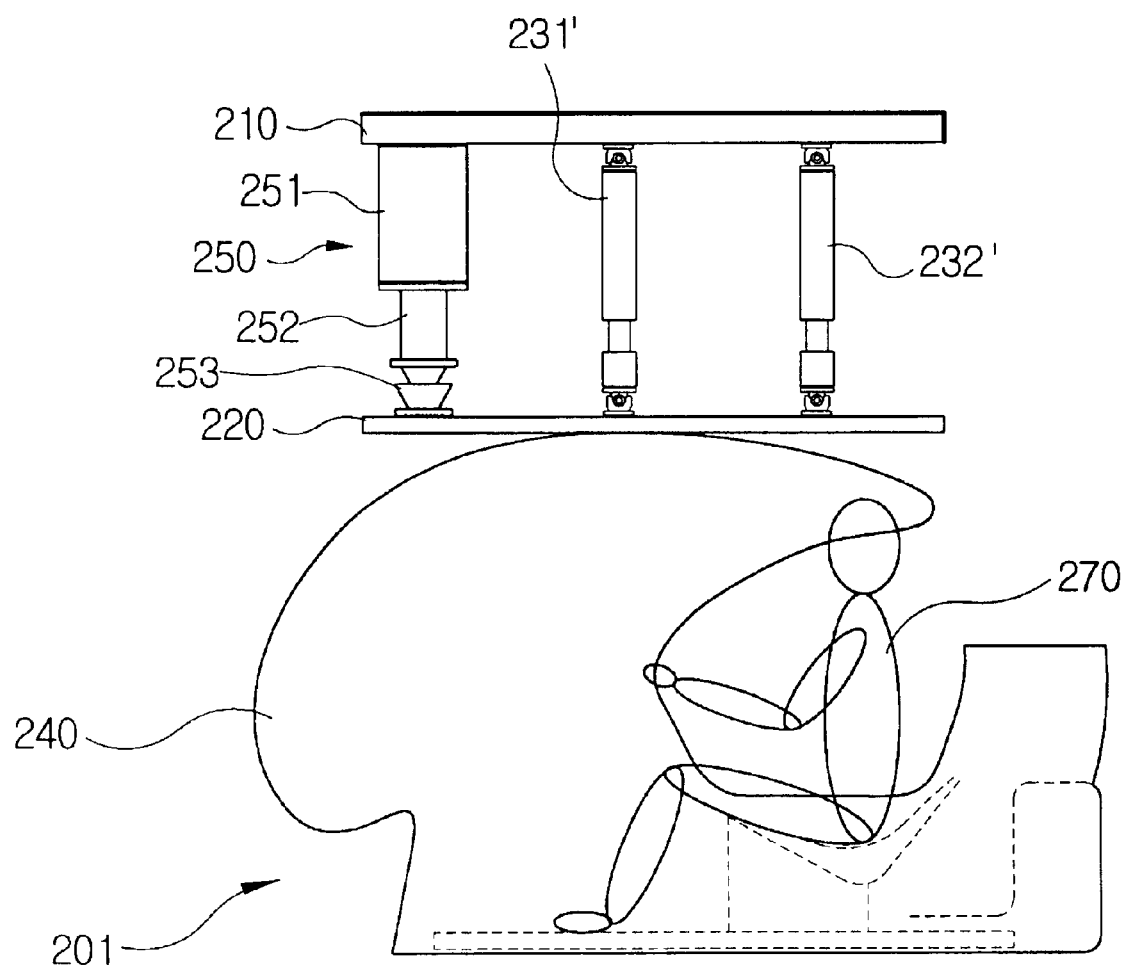
FIG. 11 is a schematic drawing of the structure of the 3 DOF motion simulator according to another embodiment of this invention.
Figure 12:
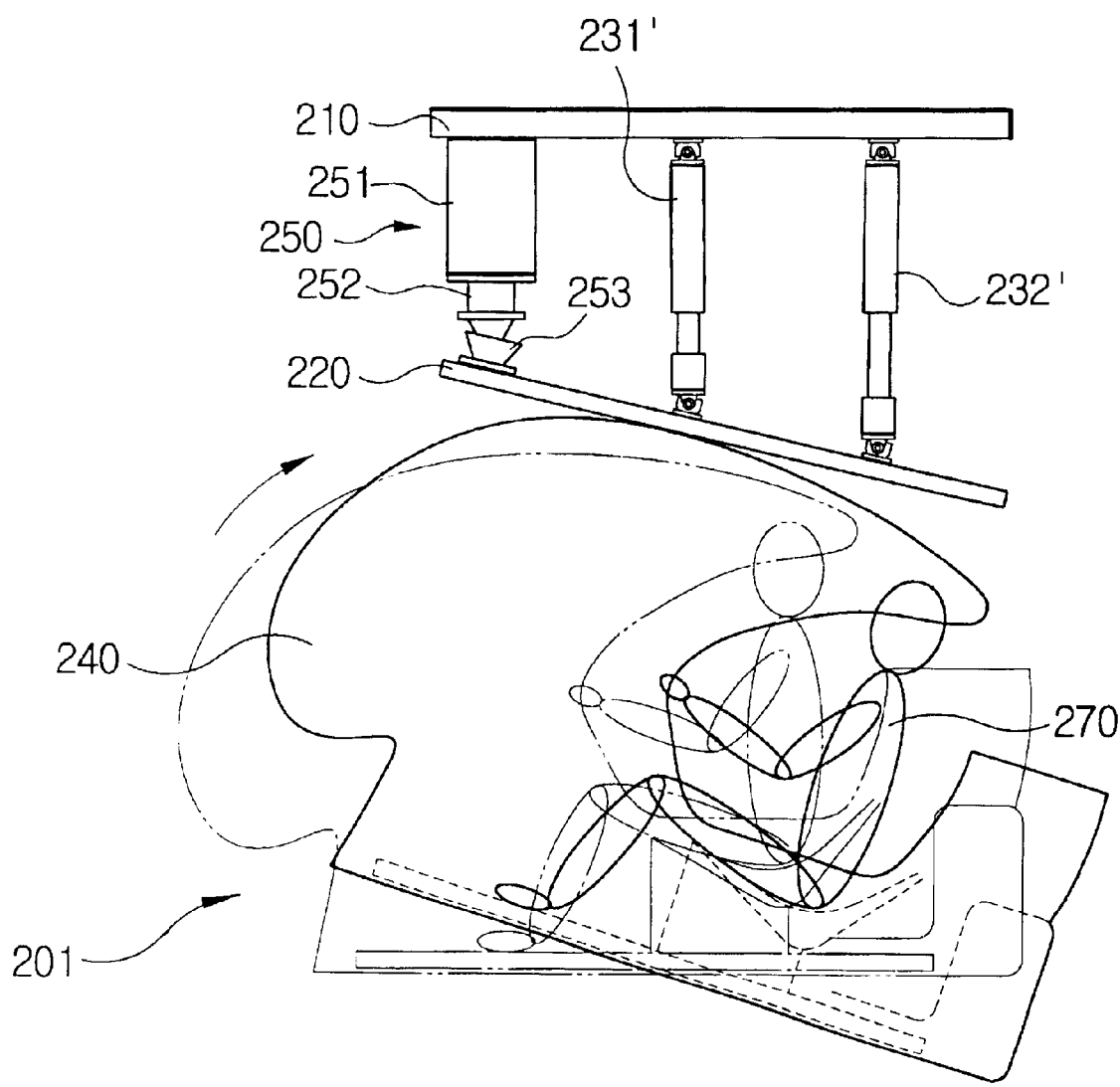
FIG. 12 is a drawing showing the accelerating sensation creation procedure of the 3 DOF motion simulator according to another embodiment of this invention.
Figure 13:
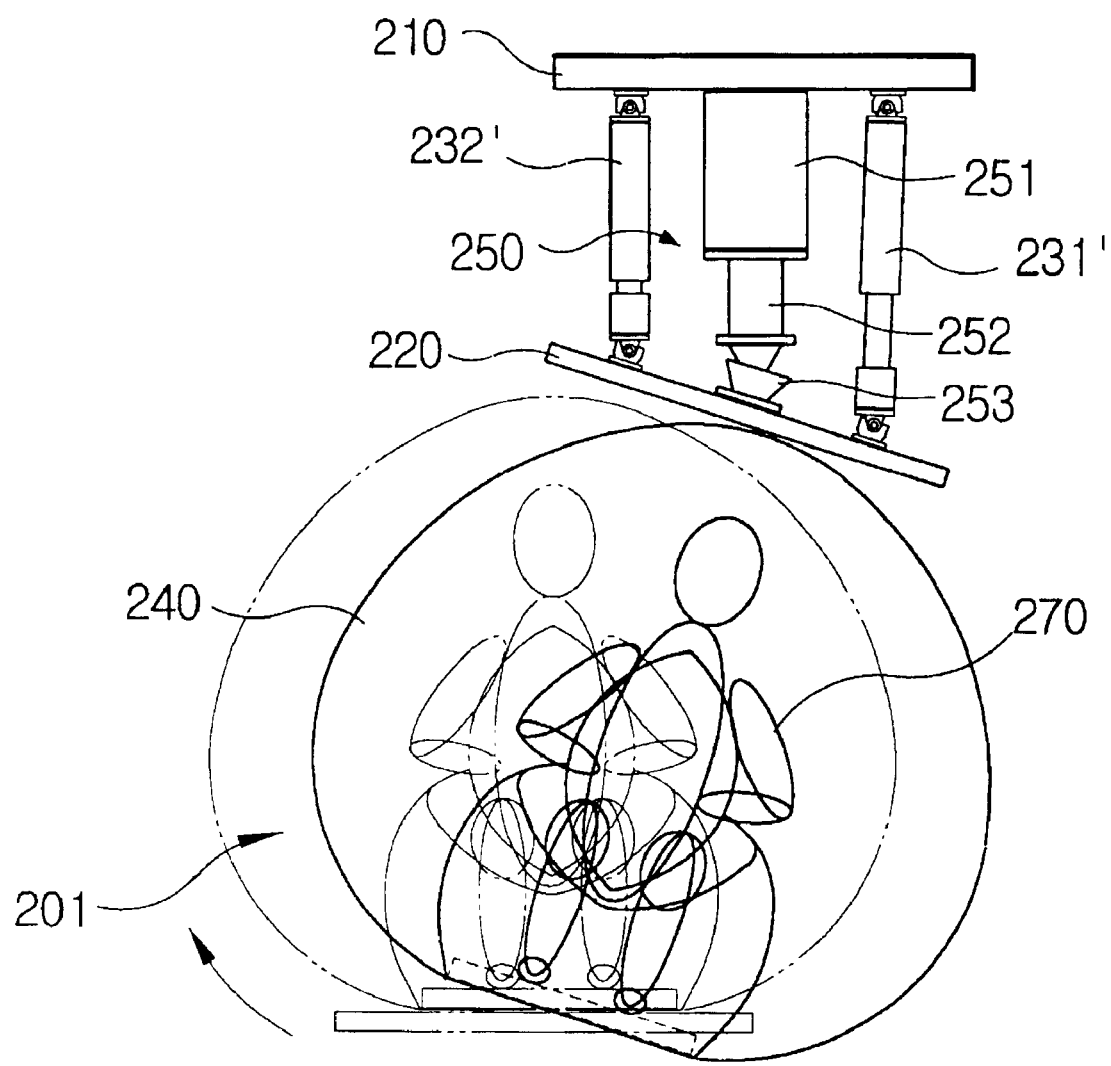
FIG. 13 is a drawing showing the rotating sensation creation procedure of the 3 DOF motion simulator according to another embodiment of this invention.

On the other hand, in FIGS. 11 to 13, the motion simulator (201) according to another embodiment of this invention is depicted. The depicted motion simulator (201) is a 3 DOF motor simulator (201) of which the movable frame (220) is driven by three actuators (231', 232', 233').

According to FIGS. 11 to 13, the configuration of the 3 DOF motion simulator (201) according to another embodiment of this invention is identical to that of the 6 DOF motion simulator (200) according to the other embodiment of this invention, except that the former has three actuators (231', 232', 233' and that it is provided with a separate support member (250) to limit the occurrence of undesired motion.

Therefore, in describing the configuration of the 3 DOF motion simulator (201) according to another embodiment of this invention, sane reference numbers are designated for parts identical to those of the 6 DOF motion simulator (200), and the descriptions thereof are omitted.

As mentioned above, because all motions of the movable frame (220) can not be restrained with only the actuators (231', 232', 233') in the 3 DOF motion simulator (201) according to another embodiment of this invention, there is provided a separate support member (250) for limiting the occurrence of undesired motion to the movable frame (220).

Said support member (250) is composed of a cylinder (251) which is fixed on the stationary frame (210), a piston (252) which moves up and down along said cylinder, and a universal joint (253) which connects said piston and the movable frame (220).

In the case of the 3 DOF motion simulator (201) according to another embodiment of this invention configured as the above, because there is no DOF to the horizontal direction, that is, the direction perpendicular to gravity, when creating continuous accelerating motion or rotating motion as mentioned above, only the force of gravity is used.

Namely, to create a linear accelerating sensation, the motion simulator (201) drives the plurality of actuators (231', 232', 233') and lifts the front of the movable frame (220) and thereby allows the passenger (270) to feel a rearward pulling sensation, as depicted in FIG. 12. The force of inertia produced from radial acceleration at the time of lifting commencement or the front portion is in the same direction as said moving sensation, and when the amount of rotational radial velocity is appropriately adjusted, the desired amount of inertia may be obtained within the control range.

In addition, to create rotating movement, the motion simulator (201) drives the plurality of actuators (231', 232', 233' and lifts one side of the movable frame (220) and thereby allows the passenger (270) to feel a pushing sensation to the other side, as depicted in FIG. 13. The force of inertia produced from radial acceleration at the time of lifting commencement of the one side is in the same direction as said moving sensation, and when the amount of rotational radial velocity is appropriately adjusted, the desired amount of inertia may be obtained within the control range.

According to the above motion simulators (200, 201) according to this invention, because both have the movable frame (220) disposed beneath the stationary frame (210), the center gravity of the passenger (270) is below the center of rotation of the movable frame (220).

Namely, because the value of the $A \times R_{pv}$, vector is in the same direction as the acceleration intended to be created, even during representation of accelerating sensations using gravity, undesired accelerating sensations to the opposite direction are not produced, and the tracking time of the desired moving sensation may be reduced.

Figure 14:
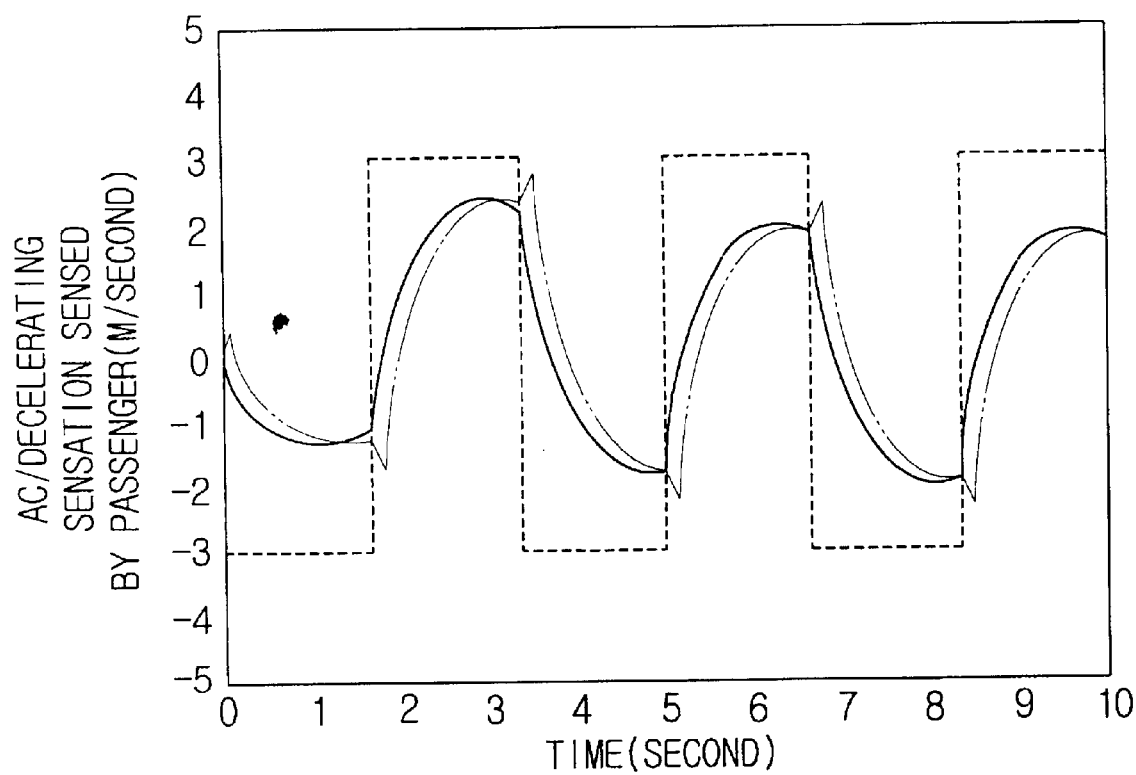
FIG. 14 is a graph showing the motion simulator of this invention being driven by inputting control reference signals that repeat 3 m/s ac/deceleration, and the ac/decelerating sensation sensed by a passenger riding the simulator.

A graph displaying the above is shown in FIG. 14. The dotted line in FIG. 14 represents the control reference signals which repeats acceleration and deceleration of 3 m/s, the imaginary line represents the ac/deceleration sensed by the passenger riding on the conventional motion simulator driven by inputting the above signals, and the solid line represents the ac/deceleration sensed by the passenger riding on the motion simulator of the present invention driven by inputting said signals.

According to the graph, in the case of he motion simulator of this invention, there are no portions sharply bulging out in the opposite direction of the change in the reference signals as in the case of the conventional simulator. This means that undesired moving sensations are not sensed, and as a result, means reduction of tracking time for the moving sensation (dotted line of FIG. 14) intended to be created, as shown by the solid line in FIG. 14. In addition, in case of riding an actual motion simulator, the two types of sensations show a large difference in the aspect of motion reality. That is, a great difference in the performance of the motion simulator is displayed.

It is to be understood, however, that even though the present invention has been described with reference to the annexed drawings which depict the preferred embodiments thereof, the present invention is not limited to the said embodiments, and may apparently be modified in many ways by those ordinarily skilled in the art without departing from the general principle and scope of the invention expressed in the appended claims.

What is claimed is:

1. A motion simulator comprising:
   a stationary frame;
   a movable frame which is disposed beneath said stationary frame in the direction of gravity, and which has a passenger compartment attached on the bottom surface thereof; and
   a driving device disposed between said stationary frame and said movable frame, which rotationally or linearly moves the movable frame.

2. The motion simulator of claim 1, wherein said passenger compartment is disposed beneath said movable frame in the direction of gravity, and thereby the center of gravity of the passenger in said passenger compartment is lower than the center of rotation of said movable frame in the direction of gravity.

* * * * *